(12) United States Patent
Azizi et al.

(10) Patent No.: US 10,320,393 B2
(45) Date of Patent: Jun. 11, 2019

(54) DYNAMIC MULTICYCLES FOR CORE-PERIPHERY TIMING CLOSURE

(71) Applicant: Intel Corporation, Santa Clara, CA (US)

(72) Inventors: Navid Azizi, Markham (CA); Aditi Kumaraswamy, Toronto (CA); Emily Alexandra Ng, Toronto (CA)

(73) Assignee: INTEL CORPORATION, Santa Clara, CA (US)

( * ) Notice: Subject to any disclaimer, the term of this patent is extended or adjusted under 35 U.S.C. 154(b) by 19 days.

(21) Appl. No.: 15/719,194

(22) Filed: Sep. 28, 2017

(65) Prior Publication Data

US 2019/0097636 A1    Mar. 28, 2019

(51) Int. Cl.

| | |
|---|---|
| *H03K 5/15* | (2006.01) |
| *H03K 3/037* | (2006.01) |
| *H03K 19/177* | (2006.01) |
| *G06F 17/50* | (2006.01) |
| *H03K 19/173* | (2006.01) |

(52) U.S. Cl.
CPC ... *H03K 19/17764* (2013.01); *G06F 17/5054* (2013.01); *H03K 5/15006* (2013.01); *H03K 19/1735* (2013.01); *H03K 19/1737* (2013.01); *H03K 19/17728* (2013.01)

(58) Field of Classification Search
None
See application file for complete search history.

(56) References Cited

U.S. PATENT DOCUMENTS

| | | | | |
|---|---|---|---|---|
| 5,455,931 | A * | 10/1995 | Camporese | G06F 1/10 713/501 |
| 5,933,623 | A * | 8/1999 | Umemura | G06F 13/4243 713/400 |
| 6,425,114 | B1 * | 7/2002 | Chan | G06F 1/10 716/113 |
| 7,605,604 | B1 * | 10/2009 | Young | H03K 19/1776 326/38 |
| 7,831,856 | B1 * | 11/2010 | Liu | G01R 31/318516 714/2 |
| 8,001,504 | B1 * | 8/2011 | Campbell | G06F 17/5031 716/106 |
| 9,477,635 | B1 * | 10/2016 | Kuscher | G06F 15/177 |
| 2013/0055007 | A1 * | 2/2013 | Dai | G06F 17/5068 713/503 |
| 2015/0281288 | A1 * | 10/2015 | Levinson | H04L 47/41 709/219 |

* cited by examiner

*Primary Examiner* — Crystal L Hammond
(74) *Attorney, Agent, or Firm* — Fletcher Yoder, P.C.

(57) ABSTRACT

Methods and systems for timing analysis and closure during logic synthesis of synchronous digital circuitry are provided, which may be used to prevent timing conflicts in logic designs that may have data transfers between regions with substantial clock skew. In programmable logic devices having hardened circuitry and programmable fabric, data transfers between memory elements in hardened circuitry and programmable fabric may be subject to substantial clock skews and unknown latencies. Embodiments may employ pre-calculated latencies that may be stored in a file and/or a database, and dynamically retrieved during timing synthesis to determine multicycle constraints to mitigate latencies. Embodiments may employ destination multicycle constraints, which use as reference the clock waveforms delayed due to latency.

20 Claims, 8 Drawing Sheets

DYNAMIC MULTICYCLES FOR CORE-PERIPHERY TIMING CLOSURE

BACKGROUND OF THE INVENTION

The present invention relates generally to synthesis of digital circuitry and, more specifically, to systems and methods for obtaining timing closure in digital circuitry design.

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Certain electrical devices, such as programmable logic devices (PLDs) and application specific integrated circuits (ASICs), may have circuitry elements that may exchange data via a bus or a wire that may have large latencies. For example, certain field-programmable gate arrays (FPGAs) may have programmable fabric region (e.g., core) that may be customized by a user, and a hardened circuitry region (e.g., hardened logic region, fixed circuitry, periphery) that may provide interface functionality to the FPGA that may be used by the custom logic. The synchronous logic in the programmable fabric region may be clocked by a clock tree, which may be generated during the FPGA synthesis process by the user. As such, the latency of the clock provided to the programmable fabric region may vary based on the FPGA design. The hardened logic, by contrast, may have a fixed clock latency that may be determined by during the synthesis of the hardened logic circuitry and may be different from the clock latency of the programmable fabric region. The differences in the clock latency in the programmable fabric region and the hardened region may lead to clock skews, which may affect performance and/or failure of the circuit. While certain synthesis process in computer assisted design (CAD) tools may reduce these clock skews, the variable latency of programmable fabric region may lead to unavoidably large clock skews, which may interfere significantly in the transfer of data between registers in the programmable fabric region and registers in the hardened logic region.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many electrical devices may include integrated circuits, such as field-programmable gate arrays (FPGAs) to perform certain functions of the electrical device. These integrated circuits may be created by creating a logic design or a register-transfer level (RTL) design and, through a synthesis process, generating logic circuitry. In application-specific integrated circuits (ASICs), the process may generate circuitry that have hardened circuitry logic. In programmable logic devices (PLDs), the process may generate instructions to program the configurable circuitry to implement the desired logic. Some programmable logic devices may also include certain functionalities that may be provided by hardened circuitry. For example, certain FPGAs may have a programmable fabric (e.g., a core) which may be customized by a user, and hardened logic (e.g., a periphery) that may implement certain routine functionalities for the user's convenience. Examples of hardened logic include circuitry that implements communication protocol (e.g., Ethernet, Bluetooth, Peripheral Component Interconnect Express or PCIe, etc.), memory interface protocols (e.g., Double Data Rate or DDR), and other communication standards such as the low-voltage differential signaling (LVDS).

During the synthesis process, design tools may take into account timing constraints when generating the logic circuitry. Timing constraints may allow proper synchronization between different elements of the circuitry to prevent certain types of failure. For example, if an RTL design implements a transfer of data between two registers, the data provided by the source register should be available and stable when the destination register latches the data. Note that clocks of the two registers may not be completely synchronized due to differences in the latency in both registers, generating clock skews. Embodiments described herein are related to methods and systems that may be used to satisfy timing constraints during the logic synthesis process under the presence of substantial and/or unmitigated clock skew. For example, the hardened circuitry in an FPGA may be a fixed latency that may not be changed by the user during synthesis of the custom logic. This latency may be substantially different from the variable clock latency that may appear in custom logic, as detailed below. Embodiments may allow satisfying time constraints for, for example, data transfers between registers in hardened logic and programmable fabric, in which clock skews be substantial. In certain embodiments, the timing constraints may be satisfied with the use of multicycles, instruction in which data transfers may employ multiple clock cycles to accomplish. Moreover, certain embodiments employ destination multicycles, whereby a circuit-design tool may determine the number of cycles used for a data transfer based on the latencies and/or skews.

Figure 1:
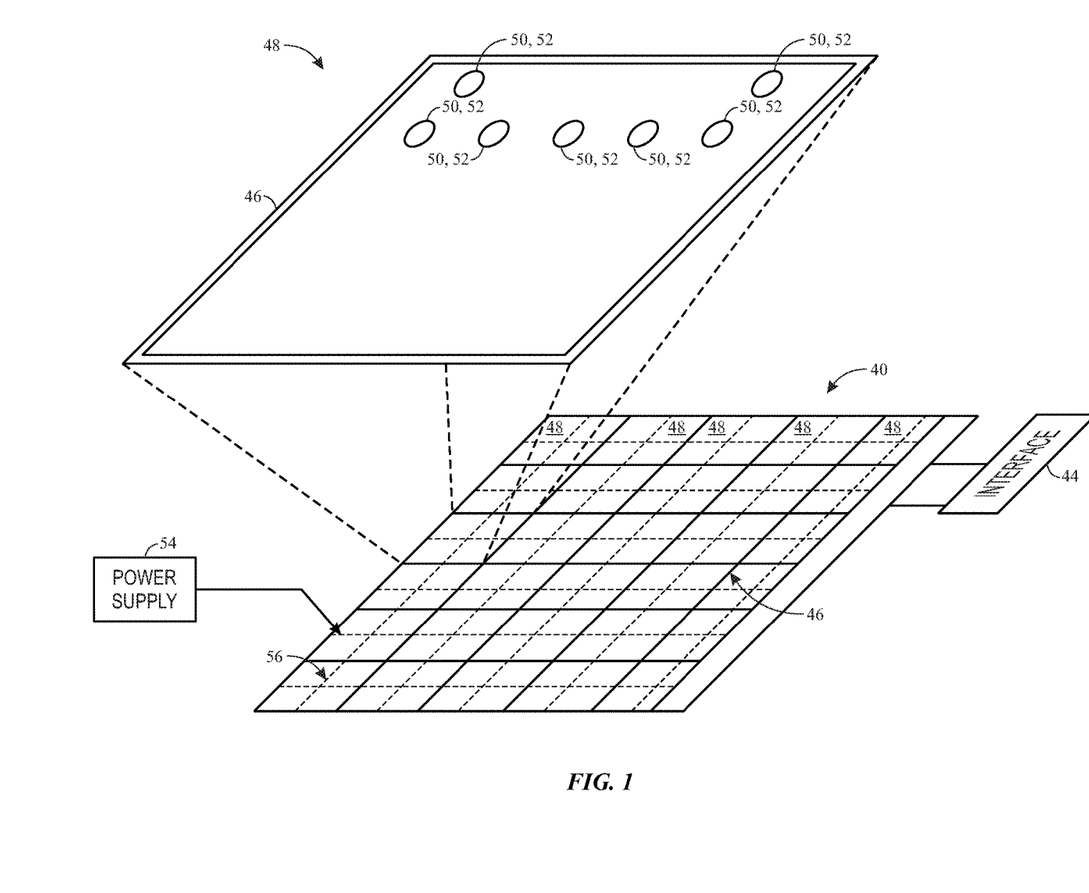
FIG. 1 illustrates an electrical device having a hardened logic region and a programmable fabric region, and may benefit from the dynamic multicycle for core periphery transfer, in accordance with an embodiment.

With the foregoing in mind, FIG. 1 provides an example of an FPGA 40 that may be programmed based on a circuit design developed using logic synthesis. The FPGA 40 may include interface circuitry 44 for driving signals off of the FPGA 40 and for receiving signals from other devices. Interface circuitry 44 may include analog circuitry (e.g., transceiver circuitry) and hardened logic circuitry to implement certain routine instructions related to the specific protocol used by interface circuitry 44. Data may be exchanged through the FPGA 40 through interconnection resources 46, which may be used to route signals, such as clock or data signals, through the FPGA 40. The FPGA 40 of FIG. 1 may include a number of programmable fabric elements 48. Each programmable fabric element 48 may include a number of programmable logic elements 50 having operations defined by configuration memory 52 (e.g., configuration random access memory, or CRAM). The programmable logic elements 50 may include combinational or sequential logic circuitry. For example, the programmable logic elements 50 may include look-up tables (LUTs), registers, multiplexers, routing wires, and so forth. A user may program the programmable logic elements 50 to perform a variety of desired functions. For example, a user may program a programmable logic element 50 to receive and/or send data to a register in interface circuitry 44 to send or receive data with an external device.

A power supply 54 may provide a source of voltage and current to a power distribution network (PDN) 56 that distributes electrical power to the various components of the FPGA 40. Operating the circuitry of the FPGA 40 causes power to be drawn from the power distribution network 56. Furthermore, the FPGA 40 may be electrically programmed. With electrical programming arrangements, the programmable elements 50 may include one or more logic elements (wires, gates, registers, etc.). For example, during programming, configuration data is loaded into the configuration memory 52 using interface circuitry 44 and/or input/output circuitry 42. In one example, the configuration memory 52 may be implemented as configuration random-access-memory (CRAM) cells. The use of configuration memory 52 based on RAM technology is described herein is intended to be only one example. Moreover, configuration memory 52 may be distributed (e.g., as RAM cells) throughout the various programmable fabric elements 48 the FPGA 40. The configuration memory 52 may provide a corresponding static control output signal that controls the state of an associated programmable logic element 50 or programmable component of the interconnection resources 46. The output signals of the configuration memory 52 may configure the may be applied to the gates of metal-oxide-semiconductor (MOS) transistors that control the states of the programmable logic elements 50 or programmable components of the interconnection resources 46.

Figure 2:
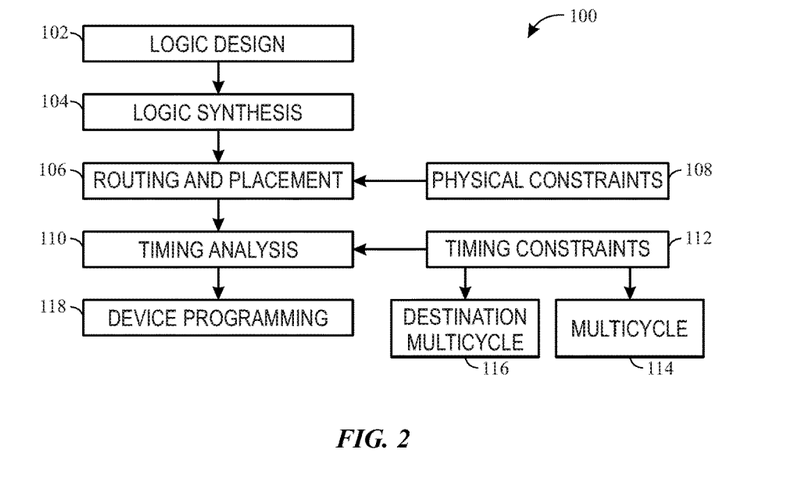
FIG. 2 illustrates a method for synthesis of circuitry which may incorporate multicycles for clock synthesis, in accordance with an embodiment.

The programming of the programmable fabric elements 48, of the power distribution network 56, and of the interconnection resource 46, which may include clocking, may take place as described above through electrical programming. The flow chart 100 in FIG. 2 illustrates a method to generate instructions for programming of an FPGA device from a logic design. In a process 102, a logic design may be generated. The logic design may include a high-level description of the functions that may be performed by the programmable fabric elements and/or the design. The logic design may be an algorithmic description of a desired behavior. In general, the logic design may be provided in a computer-readable format to a logic synthesis tool, such as a hardware description language. In some situations, the logic design may be automatically generated by the logic synthesis tool from a more abstract description. A process 104 may receive the logic design from process 102 to produce a register-transfer level (RTL) design. In process 102, the logic design may be translated into an RTL design that may include memory elements (e.g., look-up table, register, flip-flop, latch, etc.) that may be used to perform a desired function.

Electronic elements described in the RTL design may be associated with logic elements of an FPGA in routing and placement process 106. Note that process 106 may incorporate certain physical constraints 108 related to the number of logic elements and/or memory employed, bandwidth constraints, power and thermal constraints, data path and total wire length. The routing and placement process 106 may also include, may precede, or may follow a timing analysis process 110. Timing analysis process 110 may be performed by a static timing analysis (STA) tool. Timing analysis process 110 may take into account certain timing constraints 112 associated with the RTL design. For example, the operation frequency for the RTL design may limit the distance between two registers that may operate synchronously. Timing constraints 112 may also include setup and hold constraints, which may assist the validity of data that is transferred between two registers. In order to satisfy timing constraints 112, the STA tool may incorporate certain rules and/or strategies such as multicycle 114 and destination multicycle 116 strategies, which are detailed below.

Following the routing and placement process 106 and timing analysis process 110, a programming instruction may be generated in a process 118. The programming instruction may determine the placement and operation of gates, LUTs, and memory elements of the FPGA. The programming instruction may also configure the clock tree, which provides timing to the different regions of the FPGA, and the PDN, as discussed above.

Figure 3:
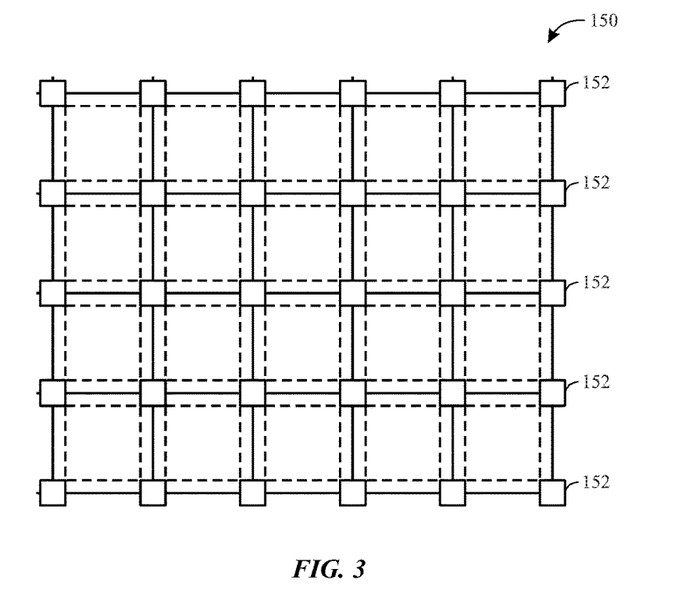
FIG. 3 illustrates a simple configurable clock network that may be used to provide clock signals for programmable fabric of the FPGA of FIG. 3, in accordance with an embodiment.

A diagram in FIG. 3 illustrates a configurable clocking network 150 for an FPGA. Clocking network 150 may have a plurality of clock switch boxes 152, which may allow clock signals to be routed in a programmable manner. The configuration of the switch boxes 152 of clocking network 150 may be produced as a result of the timing analysis process 110. For example, clock switch boxes 152 may be programmed to provide certain regions with reduced clock skew by providing balanced clock latency.

Figure 4A:
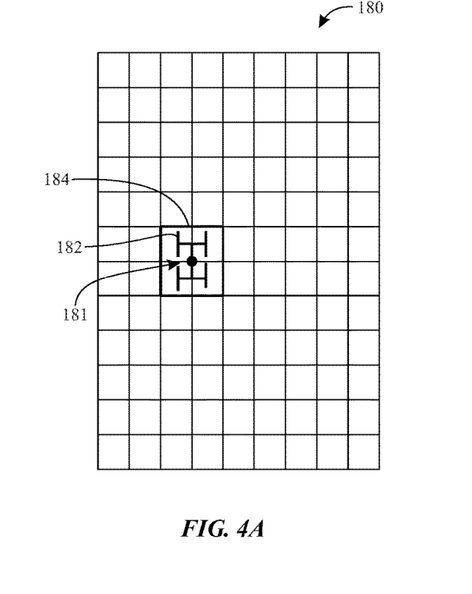
FIG. 4A illustrates a small clock tree that may be implemented in the configurable clock network of FIG. 3, in accordance with an embodiment.
Figure 4B:
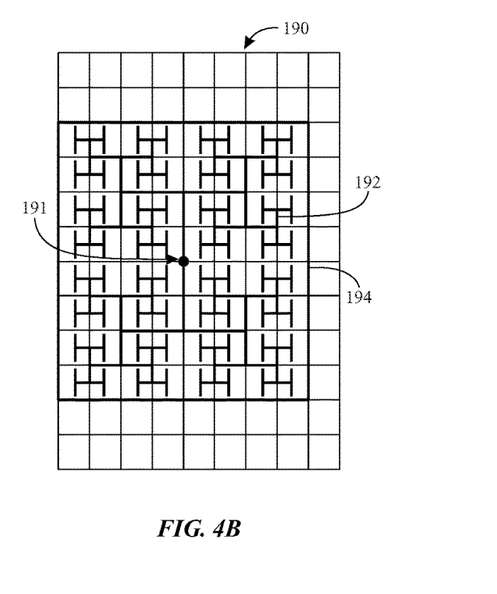
FIG. 4B illustrates a large clock tree that may be implemented in the configurable clock network of FIG. 3 and may present a different clock latency from the clock tree of FIG. 4A, in accordance with an embodiment.

FIGS. 4A and 4B provide examples of two latency-balanced clock trees that may be implemented by the switch boxes 152 described in FIG. 3. An FPGA device 180 in FIG. 4A may have a configured clock tree 182 with a clock signal source on a node 181. Clock tree 182 may reach all nodes of a region 184 of the FPGA device 180 and, thus, may be suitable for an RTL design that may have logic elements placed in a region 184. Note, further, that due to the particular layout of the clock tree 182, the latencies in the region 184 are balanced, reducing the clock skew between the logic elements of region 184. An FPGA device 190 in FIG. 4B shows a differently configured clock tree 192 with a clock signal source on a node 191. Clock tree 192 covers a larger region 194 of the FPGA 190. As a result, the clock tree 192 may be larger. Note that the layout of clock tree 192 has a particular structure such that latencies in region 194 may be balanced. This may result in a region 194 with reduced clock skew between its logic elements. Note however, that the latencies in clock tree 182 may be much smaller than the latencies in clock tree 192. As a result, if an FPGA includes a first region that receives a small clock tree similar to clock tree 182, and a second region that receives a large clock tree similar to clock tree 192, there may be a clock skew between registers in the first and the second region, similar to the above-described clock skew between registers in a programmable fabric and regions having hardened circuitry.

Figure 5:
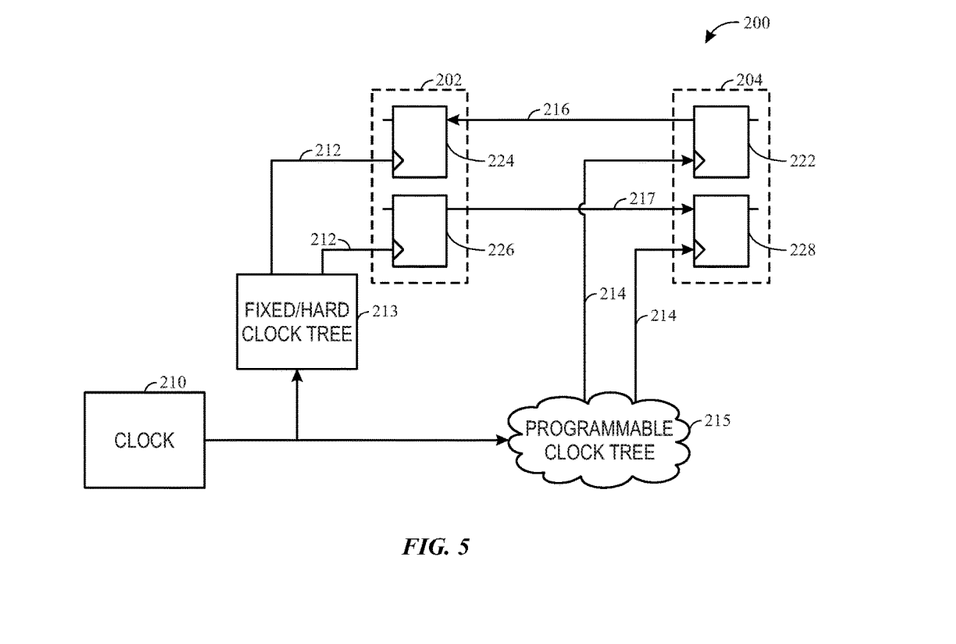
FIG. 5 illustrates a diagram of a transfer of data from a core registry to a periphery and may benefit from the use of multicycles for transfers, in accordance with an embodiment.

The electrical diagram 200 in FIG. 5 illustrates a system in which a clock skew may affect management of data transfer, as discussed above. Electrical diagram 200 may represent an FPGA device having a first region 202, which may be a hardened circuitry, and a second region 204, which may be a programmable region. Both first region 202 and second region 204 may receive clock signals that may be originated in a clock 210, which may be a phase-locked loop (PLL). First region 202 may receive clock signals 212 through a hardened clock tree 213. Second region 204 may receive clock signals 214 through programmable clock tree 215. Clock signal 212 may present a latency that is substantially smaller than the latency of clock signal 214, as discussed above. As a result, a clock skew between first region 202 and second region 204 may interfere with data transfers from core to periphery (C2P transfer) 216, and/or data transfers from periphery to core (P2C transfer) 217. A C2P transfer 216 may take place between a register 222 in the programmable first region 202 and a register 224 in the hardened second region 204. A P2C transfer 217 may take place between a register 226 in the second region 204 and the first region 202. Due to the clock skew between first region 202 and 204, C2P transfer 216 and/or P2C transfer 217 may fail due to failing to meet setup time and/or hold time constraints. Note that in this example, first region 202 may be hardened circuitry and second region 204 may be programmable, but the system may behave similarly for data transfers between two programmable regions having different clock latencies or two hardened circuitry regions having different clock latencies.

Figure 6:
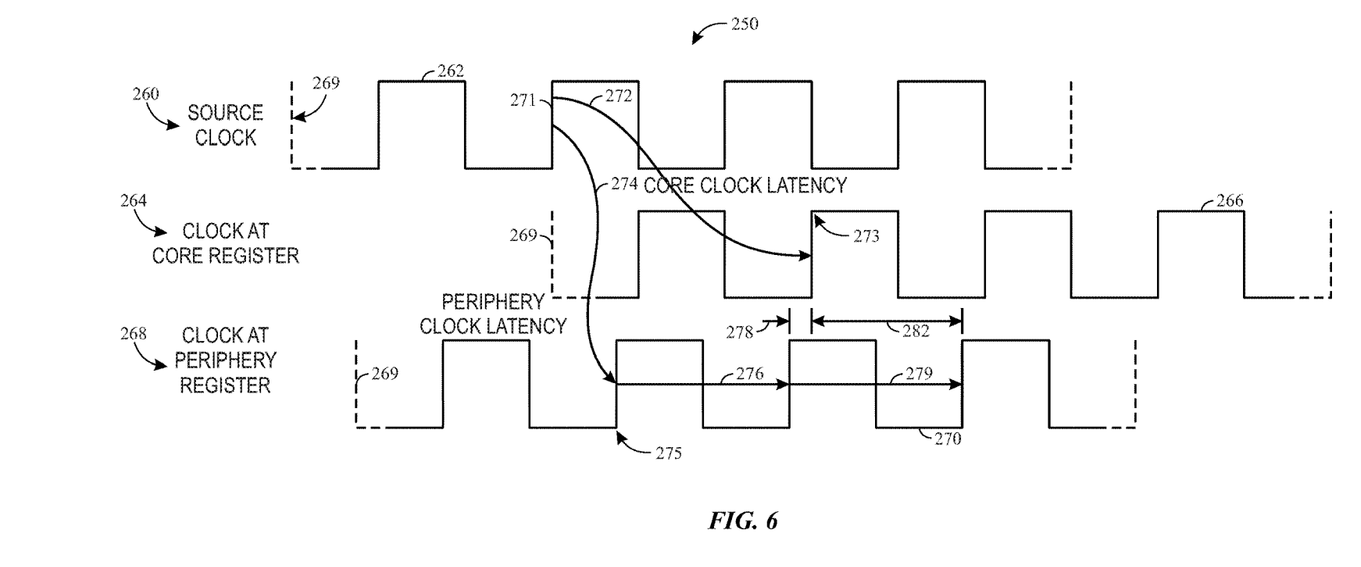
FIG. 6 illustrates a timing diagram that may use multicycle constraints for timing synthesis of data transfer between core and periphery circuitry, in accordance with embodiment.

The timing diagram 250 in FIG. 6 illustrates the effect of clock skews on the data transfer and the use of multicycles to satisfy time constraints, by exemplifying a C2P transfer. A source clock 260 may have a waveform 262 that corresponds to the signal measured in the clock source (e.g., clock 210). A core region 264 may have a waveform 266 that corresponds to the clock signal received in a programmable region (e.g., second region 204). A periphery region 268 may have a waveform 270 that corresponds to the clock signal received in a hardened region (e.g., first region 202). Note that edges 269 in waveforms 262, 266, and 270 correspond to each other, and the phase difference shown in timing diagram 250 is due to latencies. Of note, the phase difference between waveforms 266 and 270 correspond to a clock skew, as discussed above.

In the example of the timing diagram 250, a C2P transfer may occur as triggered by edge 271. In a C2P transfer, the core may make the data available, as triggered by edge 271, and the periphery may latch the data, as triggered by edge 271. However, due to the latency indicated by arrow 272, the core may only make the data available at time 273, while the periphery expects the data to be available at time 275. If periphery clock is configured to latch the data following 1 clock period after the C2P edge 271 (e.g., a 1 multicycle), it will expect data to be available during the window 276. This leads to a timing failure as the core would use a negative setup time 278. This failure may be solved by configuring C2P transfers to follow a 2 multicycle, in which the periphery clock is configured to latch the data following 2 clock periods after the C2P edge. With the multicycle of 2, the periphery register may latch data in the window 279, allowing a positive setup time 283. Note that for P2C transfers, multicycles may be used to satisfy holding time requirements when there is clock skew.

Figure 7:
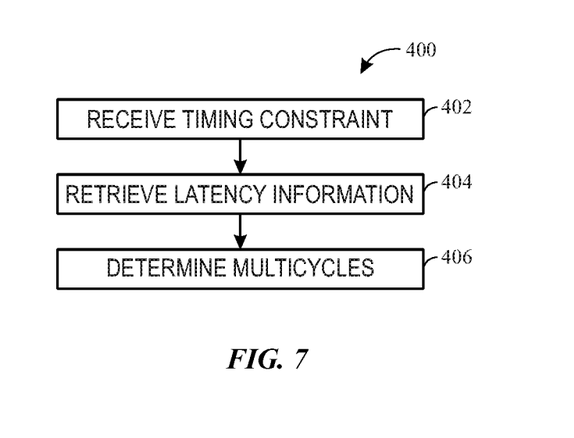
FIG. 7 is a flowchart of a method for dynamic multicycle determination with reduced iteration by employing latency information, in accordance with an embodiment.

A logic synthesis tool and/or an STA tool may identify situations in which multicycles may be used to satisfy timing requirements. To that end, the logic synthesis tool may implement a clock tree for the logic circuitry associated with the RTL design, identify the latencies of the many modules, identify data transfers and associated clock skews, and implement multicycles to the design accordingly. However, such process may be cumbersome and involve several iterations of route and placement processes, as it may involve at least one iteration of such process to identify clock latencies and clock skews, and further iterations to determine if a chosen multicycle strategy satisfy the timing constraints. Method 400 in FIG. 7 illustrates a system that may allow a dynamic multicycle strategy that determines the multicycle determination with reduced iterations. To that end, method 400 may employ latency information for hardened circuitry or from pre-designed soft circuitry (e.g., soft IP). The latency information may be determined during the design process of the hardened circuitry and/or the soft IP, and provided to a user of the FPGA along with circuitry code and/or specifications. Method 400 may have a process 402 in which the STA tool receives a timing constraint, which may be associated with a data transfer. The STA tool may then retrieve latency information in a process 404 related to circuitry that may be associated with the data transfer, such as a register, a memory device, a LUT, or any other. The information may be a pre-calculated latency that is stored in a database and/or in a file that is accessible by the STA tool or by the synthesis tool. In some embodiments, the retrieval may be implemented through a procedural call by the synthesis tool when processing a timing constraint file to a timing file and/or database that holds latency information about clocks. Based on the retrieved information, the STA tool may dynamically determine the appropriate multicycles for hold and setup edges and satisfy the timing requirements for data transfers in the FPGA design without further iterations.

Figure 8:
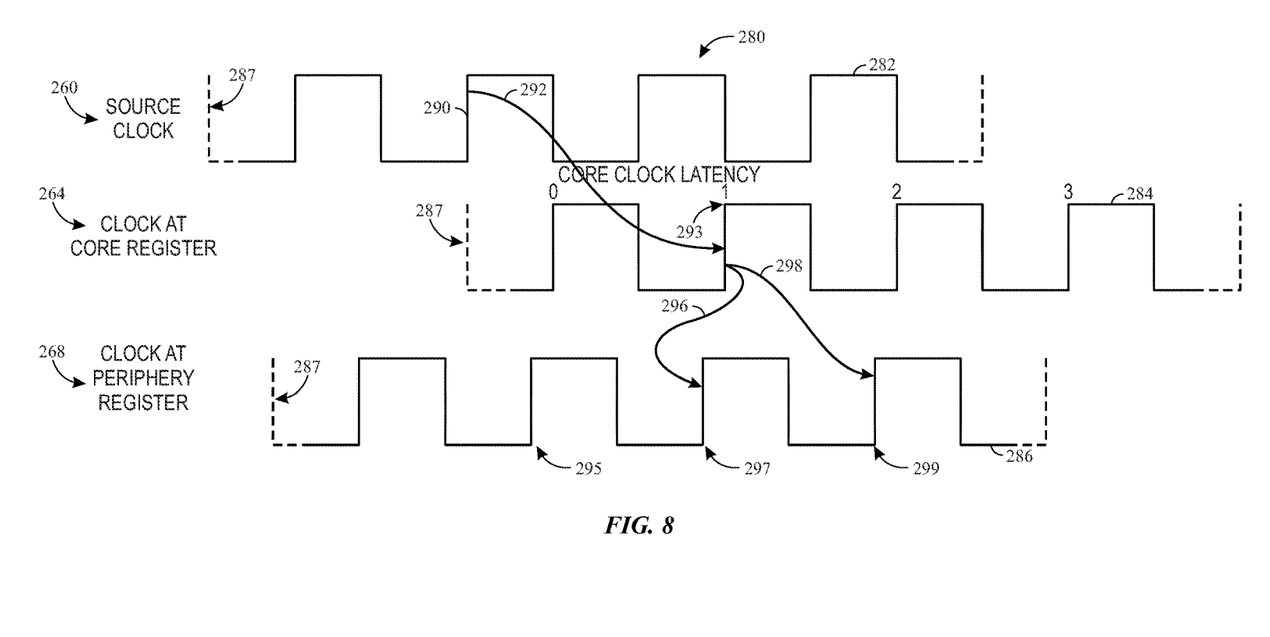
FIG. 8 illustrates a timing diagram that may use destination multicycle constraints for timing synthesis of data transfer between core and periphery circuitry, in accordance with an embodiment.

In using dynamic multicycle constraints, as described above, the relationship between clock edges used by the STA tool may be based on clock edges at the source of the clock tree. Multicycles are designed using as reference an ideal edge from source clock. The STA tool may, instead, use as references the edge as of the clock signal at the end of the clock tree to determine multicycles, leading to destination multicycle constraints. The timing diagram 280 of FIG. 8 illustrates the use of destination multicycle of 1 to satisfy the timing relationships for data transfers between regions with substantial, by means of a C2P transfer. In this example, source clock 260 may have a waveform 282 that corresponds to the signal measured in the clock source (e.g., clock 210), core region 264 may have a waveform 284 that corresponds to the clock signal received in a programmable region (e.g., second region 204), and periphery region 268 may have a waveform 286 that corresponds to the clock signal received in a hardened region (e.g., first region 202). Note that the edges 287 in waveforms 282, 284, and 286 correspond to each other, and the phase difference shown in timing diagram 280 is related to latencies. Similarly to the example in FIG. 6, the phase difference between waveforms 282 and 286 correspond to a clock skew, as discussed above.

In this example, an RTL design may include a C2P transfer that may be triggered by edge 290 at the source clock. To implement a destination multicycle constraint, the STA tool may use the clock latency at the register to identify, as illustrated with arrow 292, the corresponding edge 293 at the core. From the edge 293 and the known latency at the periphery region, the STA tool may identify, as illustrated with arrow 296, a previous edge 297 to use as a hold edge for this transfer. The STA tool may also identify, as illustrated with arrow 298, a next edge 299 to be used as a setup edge for this C2P transfer. Since the edge of waveform 286 that corresponds to edge 290 that triggers the C2P transfer is edge 295, this transfer having a destination multicycle of 1 may be similar to an implementation of a multicycle of 2. However, since the determination of the hold edge 297 and the setup edge 299 used the destination edge 293 as reference, the design may be simplified earlier in the process, when the skews and clock latencies are not yet known.

Figure 9:
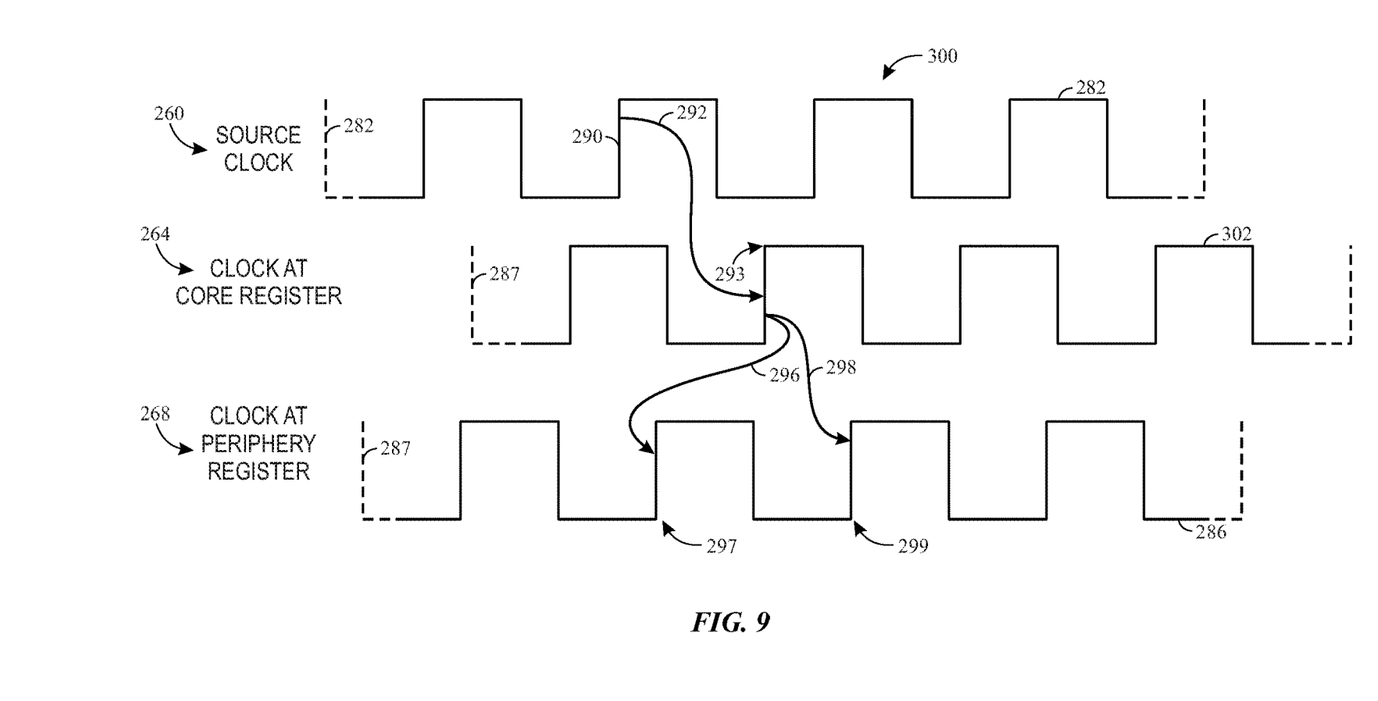
FIG. 9 illustrates a timing diagram that for circuitry that uses destination multicycle constraints for timing synthesis of data transfer between core and periphery circuitry with a different skew from that of FIG. 8, in accordance with an embodiment.

The effect of changes in skew on the destination multicycle constraint is illustrated in the timing diagram 300 of FIG. 9. Timing diagram 300 illustrates an example that is similar to the example illustrated by timing diagram 280, but in which the latency of in the core region 264 is reduced. As illustrated, the core region 264 shows a waveform 302 that has a smaller latency, when compared to waveform 284 in FIG. 8. As in timing diagram 280, the source 260 may present the waveform 282 associated with the clock source (e.g., clock 210) and periphery region 268 may have a waveform 286 that corresponds to the clock signal received in a hardened region (e.g., first region 202). Edges 287 in waveforms 282, 286, and 302 correspond to each other, and the phase difference shown in timing diagram 280 is related to latencies. Note that the clock skew between waveforms 302 and 286 is smaller than the clock skew between waveforms 282 and 286 in FIG. 6. As in timing diagram 280, the C2P transfer may be triggered by the source clock edge 290.

As discussed above, the STA tool performing an analysis using a destination multicycle of 1 may identify the edges used for the C2P transfer. As discussed above, the STA tool may identify, as illustrated with arrow 292, the edge 293 at the core that corresponds to edge 290, based on the clock latency at core region 264. Using edge 293 as a reference, the STA tool may identify, as illustrated with arrow 296, a previous edge 297 and use it as a hold edge. The STA tool may also identify, as illustrated with arrow 298, a next edge 299 and use it as setup edge. Since the edge of waveform 286 that triggers the C2P transfer and corresponds to edge 290 is the hold edge 297, this transfer having a destination multicycle of 1 may be similar to an implementation of a multicycle of 1. Note that in the example of FIG. 8, by contrast, the destination multicycle of 1 led to an implementation of a multicycle of 2. This contrast further illustrates that destination multicycles constraints may simplify the design, as it may be employed without knowledge of the specific clock skews, as may be the case during the design of hardened circuitry of an FPGA.

In the examples illustrated in FIGS. 8 and 9, the destination multicycle of 1 was determined relative to the core region 264 in a C2P transfer, which is the origin of the data transfer illustrated. In general, destination multicycles may be configured to use the data source or the data destination of the transfer as reference. For example, if a destination multicycle is configured to use the data source as a reference, the STA may initially seek the latency between the source clock and the data source register (e.g., a core register in a C2P transfer, a periphery register in a P2C transfer), identify the corresponding edge, and determine the setup and/or hold edges based on the identified edge. If a destination multicycle is configured to use the data destination as a reference, the STA may initially seek the latency between the source clock and the data destination register (e.g., a periphery register in a C2P transfer, a core register in a P2C transfer), identify the corresponding clock edge in the periphery clock for setup and/or hold, and determine the launch, setup and/or hold edges accordingly. Note further that a system may describe destination multicycles that include more than a single cycle (e.g., two cycles, three cycles, etc.).

Figure 10:
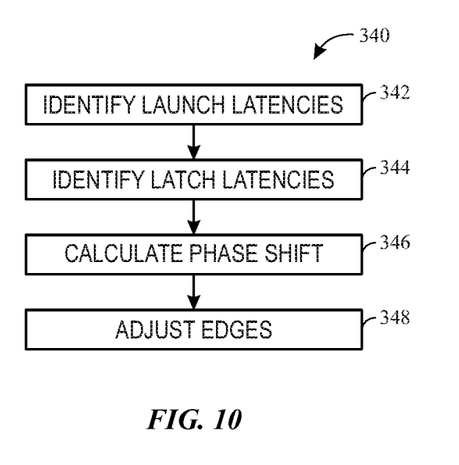
FIG. 10 illustrates a method that may be used in the timing synthesis process to determine the application of multicycle constraints by comparing clock latencies, in accordance with an embodiment.

The flow chart in FIG. 10 illustrates a method 340 to implement a destination multicycle constraints. This method may be performed by an STA tool or by a logic synthesis tool. Method 340 may be performed for each data transfer, such as one between registers located in distinct and/or distant regions, a data source element (e.g., a register) and a data destination element (e.g., a register) may be identified. In a process 342, a launch edge of the data source may be identified, based on the latency of the region of the data source. For example, in a C2P transfer, the launch edge may be that of a register in the programmable region of the FPGA device, while in a P2C transfer, the launch edge may be that of a register in the hardened circuitry of the FPGA device. In a process 344, latch edges of the data destination may be identified, based on the latency of the region of the data destination. Latch edges may be a setup edge and/or a hold edge. As discussed above, the destination region may be hardened circuitry in a C2P transfer or a programmable circuitry in a P2C transfer.

Based on the latency from the launch region and that of the latch region, a phase shift (e.g., clock skew) between the two regions may be determined. Based on the clock skew, the multicycle timing may be properly calculated. If the destination multicycle is configured to use the data source as reference, the launch edge identified may be set as a reference edge, and the setup edges hold edges may be determined based on the clock skew. For example, the setup edge may be identified as the edge in the destination that immediately precedes the launch edge, as discussed above. In this example, the hold edge may be identified as the edge in the destination clock waveform that immediately follows the launch edge. If the destination multicycle is configured to use the data destination as reference, a setup edge may be chosen as a reference and a hold edge may be determined based on that choice. Based on that choice and on the clock skew, the launch edge in the data source may be determined as an edge that precedes the hold edge follows the setup edge. Follow the determination and assignment of edges, method 340 may adjust the logic circuitry to employ the identified edges as the data transfer edges in a process 348, to implement the destination multicycle.

Figure 11:
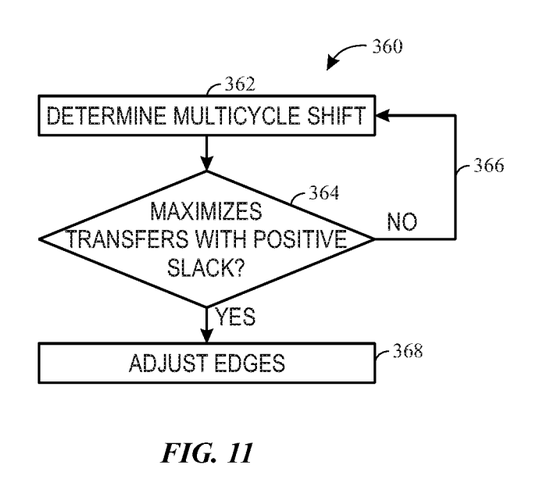
FIG. 11 illustrates a method that may be used in the timing synthesis process to determine the application of multicycle constraints by maximizing positive slack data transfers, in accordance with an embodiment.

The flow chart in FIG. 11 illustrates a method 360 to implement destination multicycles based on a global optimization of a parameter. This method may be performed by an STA tool or by a logic synthesis tool. Method 360 may be performed globally, to satisfy multiple destination multicycle and/or multicycle constraints in a single application. In an initialization process 362, the method may provide an initial multicycle configuration. This initialization process 362 may have, for example, multiple data transfers, and each data transfer may have a positive and/or negative transfer slacks. Generally, a data transfer slack may refer to a difference between the time at which a data may be available (e.g., the launch edge) and the time at which data may be latched (e.g., the hold edge). In a process 364, a figure of merit, which may be a number of data transfers with positive slacks, may be determined. The number of data transfers with a positive slacks may be compared with a threshold (e.g., fraction of data transfers with positive slacks, total number of data transfers with positive slacks) in a process 364.

If the threshold is not met, method 360 may enter a new iteration 366. In this new iteration, the multicycle configuration for the data transfers may be changed in process 362. Changes in the multicycle configuration in process 362 may be based on the data transfers that were found to have negative slack. Moreover, since these data transfers may be connected to other data transfers, certain data transfers that have positive slack may also have the destination multicycle configuration changed. Following the determination of the multicycles shifts, as described above the data transfers may be compared with the threshold in process 364. If the threshold is met, method 360 may enter a process 368 wherein the destination multicycle and/or multicycle configuration maximizes the positive slack is implemented by the configurable logic. This process may, for example, configure the logic circuitry in the programmable fabric to provide the data and/or the triggers according to the edges identified. Note that, while this example employed as figure of merit the number of transfers with positive slack, other figures of merit may be employed. For example, method 360 may, instead, minimize the number of transfers with a negative slack. Method 360 may also maximize the total slack (e.g., the sum of all positive and negative slack), maximize the sum of all positive slack, minimize the sum of all negatives slack, minimize the worst negative slack, maximize an absolute negative slack, or use other metrics that are related to the timing analysis performed.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An article of manufacture comprising one or more non-transitory machine-readable media comprising instructions to cause a processor to synthesize logic circuitry to be implemented in a programmable logic device, the instructions comprising:
   receiving a logic design;
   identifying a data transfer of the logic design, wherein the data transfer comprises a source memory element and a destination memory element, and wherein the source memory element and the destination memory element receive a clock signal from a common clock;
   calculating a clock skew between the source memory element and the destination memory element;
   adjusting the data transfer to assign a launch edge of the clock signal as received by the source memory element and a setup edge and a hold edge of the clock signal as received by the destination memory element based on the clock skew; and
   programming the programmable logic device to perform at least the data transfer.

2. The article of manufacture of claim 1, wherein the source memory element and the destination memory element comprise a look-up table, a register, a latch, a flip flop, or any combination therein.

3. The article of manufacture of claim 1, wherein the programmable logic device comprises a programmable fabric that comprises the source memory element and a hardened circuitry region that comprises the destination memory element.

4. The article of manufacture of claim 3, wherein calculating the clock skew comprises retrieving latency information associated with the hardened circuitry region from a data source, wherein the data source comprises a file or a database.

5. The article of manufacture of claim 3, wherein the hardened circuitry region comprises circuitry that implements a communication protocol.

6. The article of manufacture of claim 1, wherein calculating the clock skew comprises identifying a latency of the source memory element, identifying a latency of the destination memory element, and calculating a phase shift between the latency of the source memory element and the latency of the destination memory element.

7. The article of manufacture of claim 6, wherein adjusting the data transfer comprises:
   assigning the launch edge of the clock signal as received by the source memory element based on the latency of the source memory element; and
   assigning the setup edge and the hold edge of the clock signal as received by the destination memory element based on the clock skew.

8. The article of manufacture of claim 1, wherein adjusting the data transfer comprises calculating a slack of the data transfer.

9. A method to synthesize logic circuitry to be implemented in a programmable logic device comprising:
   receiving a logic design;

identifying a plurality of data transfers of the logic design, wherein each data transfer comprises a respective source memory element and a respective destination memory element;

calculating, for each data transfer of the logic design, a respective clock skew based on a respective source latency of a clock signal received by the respective source memory element and a respective destination latency of a clock signal received by the respective destination memory element;

assigning, for each data transfer, a respective launch edge of a clock signal received by the respective source memory element and a respective hold edge of a clock signal received by the respective destination memory element based on the respective clock skew; and programming the programmable logic device to perform at least the data transfer.

10. The method of claim 9, wherein the respective source latency, the respective destination latency, or both, are retrieved from a file or a database comprising a pre-calculated latency.

11. The method of claim 9, wherein assigning the respective hold edge comprises determining an edge of the clock signal received by the respective destination memory element that follows the respective launch edge based on the respective clock skew.

12. The method of claim 9, comprising:
calculating, for each data transfer, a data transfer slack comprising a difference between the respective launch edge and the respective hold edge; and
iteratively determining a figure of merit based on the plurality of the calculated data transfer slacks and reassigning, for each data transfer, the respective launch edge and the respective hold edge based on the figure of merit until the figure of merit crosses a threshold.

13. The method of claim 12, wherein the figure of merit comprises a number of transfers with positive slack, a number of transfers with negative slack, a maximum absolute negative slack, or any combination thereof.

14. The method of claim 9, wherein the programmable logic device comprises a programmable fabric region and a hardened circuitry region, and wherein at least one data transfer of the logic design comprises a respective destination memory element disposed in the programmable logic region and a respective source memory element disposed in the hardened circuitry region.

15. The method of claim 14, wherein the hardened circuitry region comprises low-voltage differential signaling.

16. The method of claim 9, comprising determining a clock tree that provides clock signals to a plurality of logic elements based on the logic design.

17. An article of manufacture, comprising instructions to cause a processor to:
communicate with a programmable logic device that comprises a programmable fabric and fixed circuitry;
receive a logic design, the logic design comprising at least one data transfer between a memory element in the programmable fabric and a memory element in the fixed circuitry;
retrieve a latency information associated with the fixed circuitry from a file, a database, or any combination thereof;
determine a multicycle constraint based on the latency information and the logic design;
assign a launch edge and a hold edge of the data transfer based on the multicycle constraint; and
program the programmable logic device.

18. The article of manufacture of claim 17, wherein retrieving the latency information comprises performing a procedural call to the file, the database, or any combination thereof.

19. The article of manufacture of claim 17, wherein the fixed circuitry that comprises a communication protocol.

20. The article of manufacture of claim 17, wherein the memory element in the programmable fabric and the memory element in the fixed circuitry comprises a register.

* * * * *